F. W. PEEK, Jr.
OPERATING DIRECT CURRENT GENERATORS IN MULTIPLE.
APPLICATION FILED APR. 8, 1908.
905,746.
Patented Dec. 1, 1908.
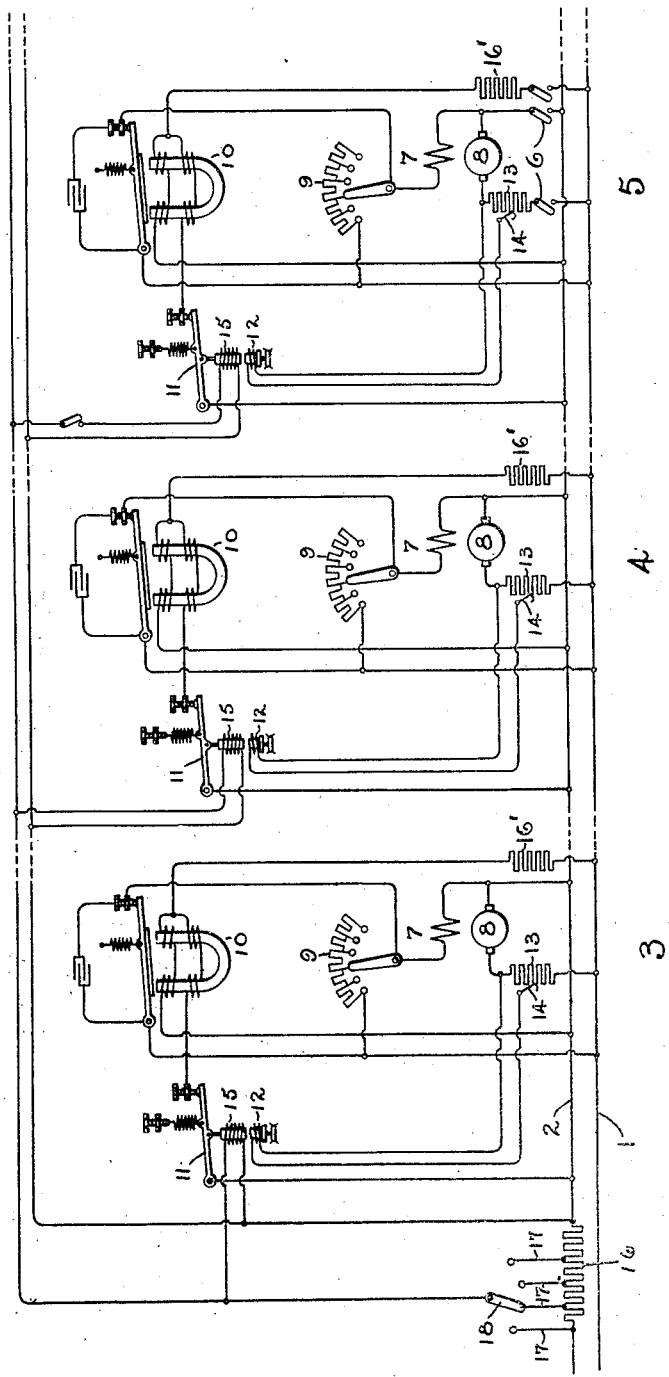
WITNESSES:
INVENTOR
FRANK W. PEEK, JR.
BY
ATTY.

UNITED STATES PATENT OFFICE.

FRANK W. PEEK, JR., OF SCHENECTADY, NEW YORK, ASSIGNOR TO GENERAL ELECTRIC COMPANY, A CORPORATION OF NEW YORK.

OPERATING DIRECT-CURRENT GENERATORS IN MULTIPLE.

No. 905,746.          Specification of Letters Patent.          Patented Dec. 1, 1908.

Application filed April 8, 1908. Serial No. 425,808.

*To all whom it may concern:*

Be it known that I, FRANK W. PEEK, Jr., a citizen of the United States, residing at Schenectady, county of Schenectady, State of New York, have invented certain new and useful Improvements in Operating Direct-Current Generators in Multiple, of which the following is a specification.

This invention relates to direct-current generators, and its object is to enable any number of such generators to be run in multiple, each machine taking its own share of the total load, or any part of the load that the operator may deem proper to put upon it. The invention has especial reference to generators equipped with voltage regulators of the well-known Tirrill type.

When two or more direct-current machines, each provided with a Tirrill regulator, are connected in parallel, the regulators will still maintain constant voltage, but each machine does not always take its own share of the load. In fact, it is possible for one or more of the machines to run as motors. My invention aims to obviate this difficulty, and it consists in brief in providing the main control magnet of each regulator with two additional coils, one supplied with current from its individual generator, and the other supplied from one of the bus-bars into which all the machines feed. By properly proportioning the resistance of the circuits, these coils will neutralize each other when the line current is equally divided between the machines. But if one machine tends to take more than its share of the load, the regulator will be operated to lower the voltage of said machine, and will thus restore the equilibrium between the several machines.

The accompanying drawing is a diagram of circuits illustrating one mode of carrying my invention into effect.

The load circuit is represented by the lines 1—2, into which feed three generators 3—4—5. Any one or more of said generators can be disconnected from the line by suitable means, such as the switches 6, which are shown only in connection with the generator 5, but will of course be furnished for each machine. Each generator field coil 7 is in shunt to the armature 8, and is in series with a rheostat 9, which is in turn shunted by a relay 10 having a differential winding, and which has in series therewith a resistance 16'. One part of the differential winding is permanently connected across the line 1—2, while the other is controlled by a switch. The lever arm 11 of said switch is attached to the movable core of the main control magnet of the regulator, which has a differential winding in addition to its usual potential winding; the latter being omitted from the drawing to avoid confusion. The coil 12 of said main control magnet is in shunt to a non-inductive resister 13 located in one of the leads from the armature 8 to the line 1. The current diverted to said coil by said resistance can be adjusted in amount by a sliding contact 14. The coil 15 of the main control magnet is supplied with current from the main line 2, in which is interposed a non-inductive resistance 16, to which said coil is in shunt. Where several generators are used, this resistance is divided into sections, with taps 17 leading off between said sections, and a switch lever 18 coöperating with said taps to enable the number of sections shunted by the coils 15 to be made inversely to the number of machines in use. The several coils of the several machines are all connected in multiple.

The resistance of the resister 16 is equal to that of each of the resisters 13. With two machines in circuit and operating in parallel, the switch 18 is set to make the effective resistance of the resister 16 equal to one half that of the resister 13. Then, with an equal division of the line current between the two machines, the coils 12 15 in each regulator balance each other, and have no effect on the voltage. But if one generator tends to take more than its share of the total load, the flux due to its coil 12 becomes greater than that due to its coil 15, and the regulator is caused to reduce the voltage of that machine, and thereby decreases the portion of the load taken thereby. At the same time, the regulator on the other machine acts to raise its voltage and throw more of the load on it. In this way the load is kept equally divided between the two machines. The same effect will be produced if more than two machines are in circuit, the resister 16 being properly set to correspond with the number of machines.

Any machine may be caused to take more or less than its pro rata share of the load by adjusting the sliding contact 14. Compounding may be effected by changing the switch 18 of the resister 16.

What I claim as new, and desire to secure by Letters Patent of the United States, is,—

1. Means for maintaining a predetermined division of load between generators connected in parallel, which consists in a voltage regulator for each generator, containing a main control magnet having a differential winding, one portion of which is responsive to changes in the current of its individual generator, and the other portion to changes in line current.

2. The combination with two or more generators connected in parallel, of a voltage regulator for each machine, a resister in an armature lead, a coil on the main control magnet of the regulator in shunt to said resister, a resister in the line, and a coil in shunt to said line resister and located on said main control magnet with its winding in opposition to that of the aforesaid coil.

3. The combination with two or more generators connected in parallel, of a line, a resister in said line, a circuit in shunt to said resister, coils across said shunt circuit, voltage regulators for said generators each including one of said coils, and a coil in opposition to the aforesaid coil, taking current from its own generator.

4. The combination with two or more generators connected in parallel, of a line, a resister in said line, a circuit in shunt to said resister, coils across said shunt circuit, voltage regulators for said generators each including one of said coils, a coil in each regulator wound in opposition to the aforesaid coil and taking current from its own generator, and means for adjusting the resistance of the line resister in accordance with the number of generators in circuit.

5. The combination with two or more generators connected in parallel, of a line, a resister in said line, a circuit in shunt to said resister, coils across said shunt circuit, voltage regulators for said generators each including one of said coils, a coil in each regulator wound in opposition to the aforesaid coil in taking current from its own generator, and means for adjusting the resistance of each generator resister.

In witness whereof, I have hereunto set my hand this 6th day of April, 1908.

FRANK W. PEEK, Jr.

Witnesses:
HELEN ORFORD,
BENJAMIN B. HULL.